C. LAUPRÈTRE.
SHIP'S PORTHOLE, SCUTTLE, AND THE LIKE.
APPLICATION FILED APR. 15, 1920.
1,392,771.
Patented Oct. 4, 1921.
3 SHEETS—SHEET 1.
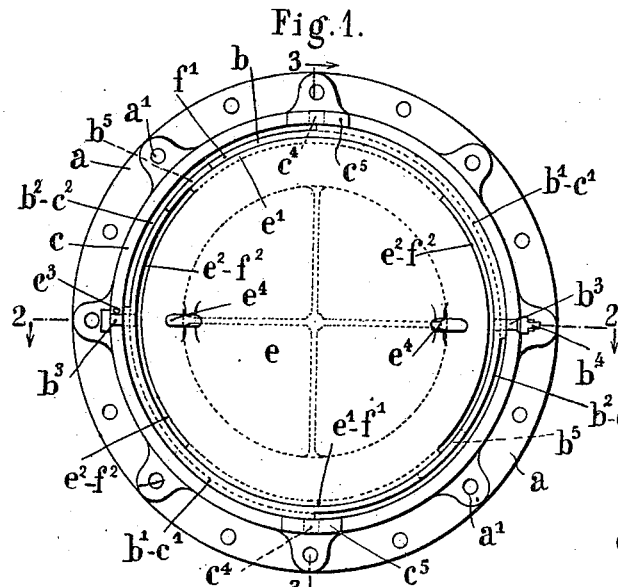
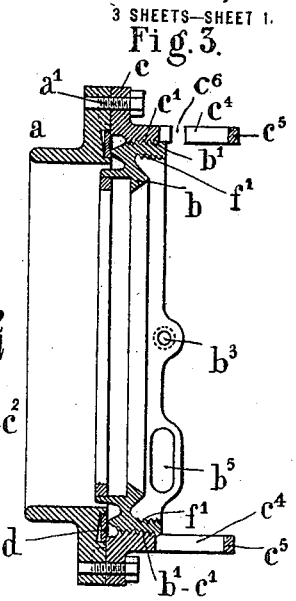
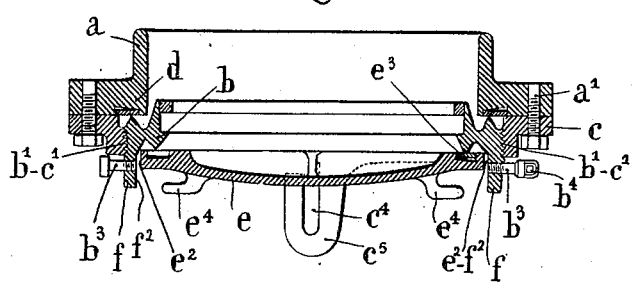
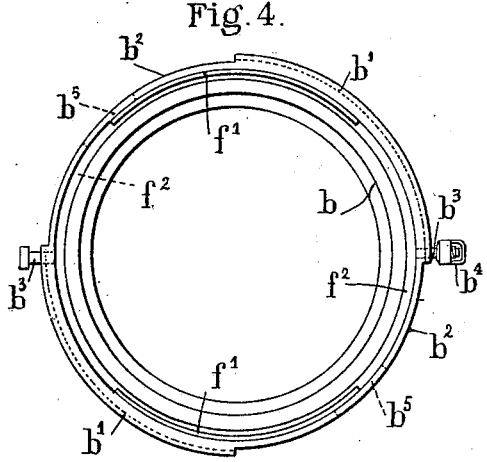
INVENTOR
CLAUDE LAUPRÈTRE
By Johnson and Johnson
ATTORNEYS

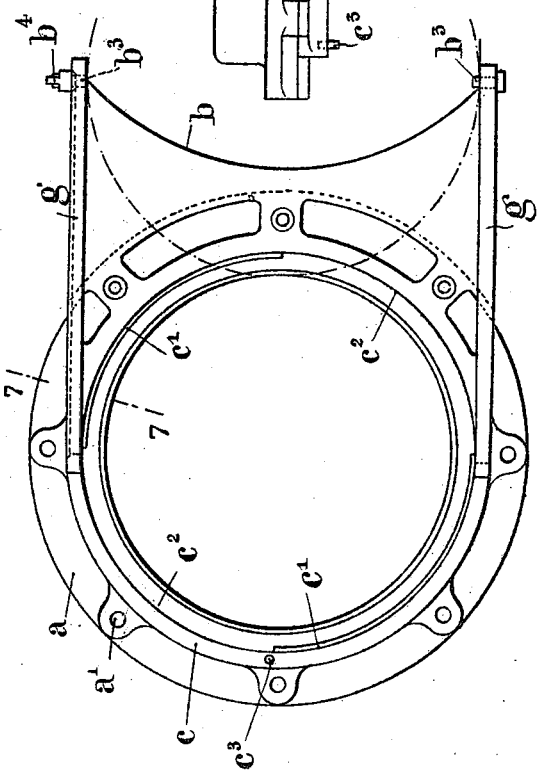

C. LAUPRÈTRE.
SHIP'S PORTHOLE, SCUTTLE, AND THE LIKE.
APPLICATION FILED APR. 15, 1920.
1,392,771.
Patented Oct. 4, 1921.
3 SHEETS—SHEET 3.
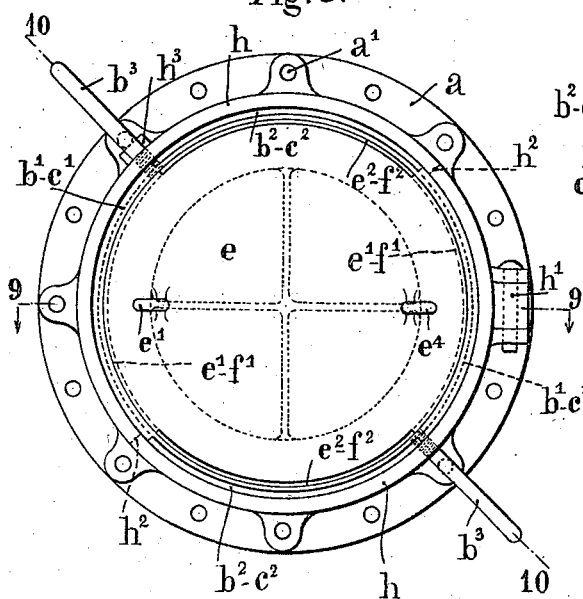
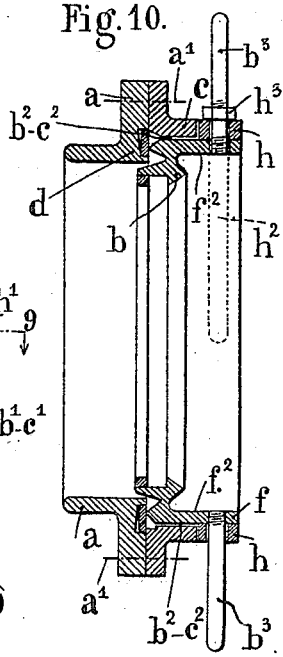
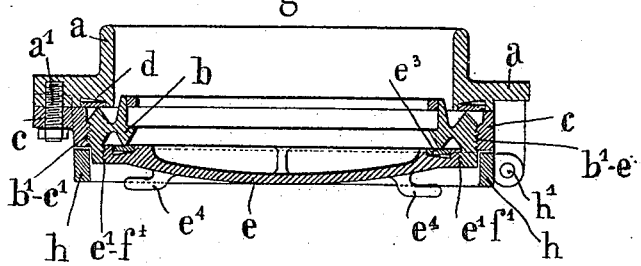
INVENTOR
CLAUDE LAUPRÈTRE
BY Howson and Howson
ATTORNEYS

UNITED STATES PATENT OFFICE.

CLAUDE LAUPRÈTRE, OF NANTES, FRANCE, ASSIGNOR OF ONE-HALF TO SOCIÉTÉ ANONYME DES ATELIERS ET CHANTIERS DE LA LOIRE, OF PARIS, FRANCE, A CORPORATION OF FRANCE.

SHIP'S PORTHOLE, SCUTTLE, AND THE LIKE.

1,392,771.     Specification of Letters Patent.     Patented Oct. 4, 1921.

Application filed April 15, 1920. Serial No. 374,167.

*To all whom it may concern:*

Be it known that I, CLAUDE LAUPRÈTRE, a citizen of the Republic of France, and a resident of Nantes, France, have invented new and useful Improvements in Ships' Portholes, Scuttles, and the like, (for which I have filed applications in France, Jan. 23, 1919; Spain, Jan. 15, 1920; Holland, Jan. 20, 1920, and Sweden, Jan. 20, 1920,) of which the following is a specification.

This invention has for its object to provide an improved apparatus which will allow of forming rapidly and automatically in the ordinary course of working, a tight joint between the fixed frame and the movable glass-holder of ships' portholes, scuttles or the like (hereinafter referred to as "scuttles"), as well as, if desired, between the glass-holder and the cover in cases where the scuttle comprises a cover. This apparatus assures a tightening action of uniform intensity over the entire circumference of the joint packings between the frame and the glass-holder on the one hand, and the glass-holder and the cover on the other; said tightening action being automatically always the same, neither greater nor less than is necessary to produce the desired watertightness.

According to this invention, the movable glass-holder of the scuttle comprises at its periphery screwthreads designed to engage a screwthread of the same pitch formed on the inside of the aperture of the fixed frame, this screwthread being cut away both on the frame and on the glass-holder for certain portions of the circumference (for instance on opposite quadrants), in such a manner that by moving the glass-holder parallelly to itself and engaging its screwthreads in the gaps of the screwthread of the frame, the glass-holder can be brought into contact with the joint packing, and then by producing a screwing action through the equal fraction of a revolution, for instance through one quarter of a revolution, it is possible to engage together the screw-threads of the glass-holder and of the frame in such a manner as to exert a tightening action upon the joint packing.

Similarly, the removable cover may be screw-threaded on portions of its periphery and screwed inside a collar which forms an extension of the glass-holder and which is tapped on corresponding portions of its periphery in such a manner as to produce a tightening action upon the joint packing interposed between the glass-holder and the cover.

When the screwthreads of the glass-holder are unscrewed from the screwthreads of the frame, the glass-holder can be moved away from the frame and be shifted either parallelly or laterally in relation to the plane of the frame and be engaged by means of pins in slideways in which it can assume any desired position parallel or at right angles or inclined to the plane of opening of the frame.

Instead of being entirely removable, the glass-holder may be carried inside a ring which is itself hinged to the frame, so that after having moved this ring close to the frame, the glass-holder can be rotated in this ring in such a manner as to engage its screwthreads with the corresponding screwthreads of the frame, and thus assure a tightening action upon the joint packing.

The accompanying drawings illustrate by way of example various constructional forms of this invention.

Figures 1 to 4 illustrate a first constructional form of the tight-jointing device of the scuttle.

Fig. 1 is a front elevation of a scuttle with frame, glass-holder and cover in the tight-jointed closed position.

Fig. 2 is a section along the horizontal diameter 2—2 of Fig. 1.

Fig. 3 is a section along the vertical diameter 3—3 of Fig. 1, after removal of the cover.

Fig. 4 is a separate view in front elevation of the glass-holder.

Figs. 5 to 7 illustrate a second constructional form.

Fig. 5 is a front elevation of the scuttle, the glass-holder having been shifted laterally in its slideways so as to uncover the aperture in the frame.

Fig. 6 is a plan thereof.

Fig. 7 is a section on the line 7—7 of Fig. 6.

Figs. 8 to 10 relate to a third constructional form.

Fig. 8 is a front elevation of the scuttle with frame, glass-holder and cover in the tight-jointing position.

Fig. 9 is a section along the horizontal diameter 9—9 of Fig. 8.

Fig. 10 is a section along the diameter 10—10 of Fig. 8, the cover being removed.

In the constructional form shown in Figs. 1 to 4, an annular disk $c$ is fixed to the fixed frame $a$ of the scuttle by means of lugs and screws or pins $a^1$. The glass-holder $b$ is screw threaded on its outer periphery on two opposite quadrants $b^1 b^1$ (Fig. 4); the screw-thread being entirely absent on the other two quadrants or quarters of the circumference of the glass-holder, as shown at $b^2 b^2$. Similarly, the annular disk $c$ fixed to the frame $a$ is formed with an internal screw thread on two opposite quadrants $c^1 c^1$; whereas this screw thread is entirely absent on the other two quadrants $c^2 c^2$. By placing the screw threaded quadrants $b^1 b^1$ of the glass-holder opposite plain (non-screw threaded) quadrants $c^2 c^2$ of the disk $c$, then moving the glass-holder parallel to its own plane so as to bring it nearer the frame, the glass-holder $b$ can be brought into contact with the joint packing $d$ mounted on the frame $a$. The position of the disk $c$ in the longitudinal direction has been so adjusted that at this moment the screw threads $b^1 b^1$ of the glass-holder, and $c^1 c^1$ of the disk $c$ serving as a nut, are able to come into engagement. On then rotating the glass-holder through a quarter of a revolution, the glass-holder is brought nearer to the frame by screwing the glass-holder in its nut, that is to say, a tightening action is produced upon the joint packing $d$, the amount of this approaching or tightening movement being equal to one quarter of the pitch of the screw thread of the quadrants $b^1 b^1 c^1 c^1$. A screw $c^3$ serves as a stop to limit the extent of the rotation of the glass-holder in order that the tightening effect shall always be the same.

The glass-holder $b$ is provided with two diametrally opposite trunnions $b^3 b^3$. When the screw threads $b^1 b^1$ of the glass-holder have been disengaged from the screw threads $c^1 c^1$ of the nut $c$ by a quarter turn in the reverse direction, the said trunnions are adapted to engage in mortises $c^4$ cut at right angles to the plane of the scuttle in circular lugs $c^5$ extending from the nut $c$. By sliding the trunnions $b^3$, in these mortises $c^4$ the glass-holder $b$ can be moved a sufficient distance away from the frame to allow it to pivot on these trunnions $b^3$ and to assume any desired position, parallel, at right angles or inclined to the plane of the aperture in the frame. Upon the rotation of the glass carrier in a direction to free the threaded segments thereof from the tapped segments of the ring $c$, the trunnions $b^3$ enter the slots $c^4$ in the lugs $c^5$ through lateral ways $c^6$, one of which is indicated in Fig. 3.

One of the two trunnions, or both, may be provided externally with a nut $b^4$ which allows of exerting a tightening action upon the corresponding lug $c^5$ of the nut disk $c$, and thus fixing the glass-holder in any desired position corresponding to the position that may be taken up by the trunnions in the mortises $c^4$. $b^5$ are handles for operating the glass-holder $b$. Ventilation is obtained by causing the glass-holder $b$ to turn on its trunnions, thus allowing of regulating the aperture in the frame and of directing a current of air forward or backward at will.

Similarly, the removable cover $e$ comprises at its periphery a screw thread arranged to screw in a corresponding screw thread formed in a circular extension $f$ of the glass-holder intended to serve as a nut. The screw thread is formed only on two opposite fourths $e^1 e^1$ of the circumference of the cover $e$, as well as on two opposite fourths $f^1 f^1$ of a portion of the nut $f$, whereas the screw thread is absent on the opposite quadrants $e^2 e^2$ of the cover and $f^2 f^2$ of the nut $f$.

When the cover is brought into contact with the glass-holder, the screw threads $e^1 e^1$ come opposite the gaps $f^2 f^2$ of the nut, and the cover can then be moved parallelly to its own plane until the joint packing $e^3$ carried by the cover, comes into contact with the knife-edge of the glass-holder. The position of this packing $e^3$ is adjusted in the longitudinal direction in such a manner that at this moment the screw threads $e^1 e^1$ of the cover $e$, and $f^1 f^1$ of the nut $f$ shall be able to come into engagement. On then turning the cover through one quarter of a turn, the latter is brought nearer to the glass-holder, that is to say, a tightening action is exerted upon the joint packing $e^3$. The amount of this approaching or tightening movement is equal to a quarter of the pitch of the screw thread. $e^4$ are handles for operating the cover $e$ for tightening or loosening it upon the glass-holder $b$.

In the constructional form illustrated in Figs. 5, 6 and 7, the nut $c$ fixed to the frame $a$ of the sector, is provided with two parallel slideways $g$ having between them a distance equal to the external diameter of the glass-holder $b$. In each of these slideways there is a groove $g^1$ designed to allow of the passage of the corresponding trunnion $b^3$ of the glass-holder. After having disengaged the screwthreads $b^1 b^1$ of the glass-holder from the screwthreads $c^1 c^1$ of its nut $c$ by rotation through ¼ of a turn, the trunnions $b^3$ enter the grooves $a^2$ of the slideways $g$, and then the glass-holder can be pulled toward the operator in such a manner as to bring these trunnions to the bottom of the grooves $g^3$. Finally, the glass-holder is pushed sidewise until the trunnions $b^3$ come to the bottom of the grooves $g^1$ of the slideways. The glass-holder $b$ will then be moved completely away from the aperture in the frame $a$ of the scuttle provided that care has been taken to make these grooves of suitable length. In the same manner as in the preceding constructional form one of the trunnions $b^3$, or both trunnions, may be provided with a nut $b^4$ which will allow of fixing the glass-holder in any position that the trunnions may occupy in the grooves $g^1$ or $g^3$ of the slideways.

In the modification illustrated in Figs. 8, 9 and 10, the construction of the glass-holder $b$ is the same as in the preceding constructional forms, but it is carried inside a ring $h$ which is itself hinged at $h^1$ to the frame $a$ of the scuttle. The two trunnions $b^3$ mounted diametrically opposite each other on a glass-holder are capable of turning and sliding in the two grooves $h^2$ $h^2$ of the ring, which said grooves extend each over a quarter of the circumference, in such a manner as to allow of tightening or loosening the glass-holder relatively to its nut $c$. Of course the trunnions $b^3$ are passed through the slots $h^1$, $h^2$ in the ring $h$ after the glass holder has been assembled with relation thereto. When the ring $h$ has been turned on its hinge $h^1$ in such a manner as to bring the glass-holder into contact with the joint packing $d$ on the frame, then by rotating the glass-holder ¼ of a turn, the screwthreaded portions $b^1$ $b^1$ of the glass-holder can be brought into engagement with the corresponding screw-threaded portions $c^1$ $c^1$ of the disk $c$ that serves as its nut, and the glass-holder can be tightened against the joint packing $d$. Inversely, by turning the glass-holder through ¼ of a turn in the other direction, the screw-threaded portions of the glass-holder will be disengaged from those of its nut, and then the ring $h$ can be moved away from the frame $a$ of the scuttle by causing the said ring to turn on its hinge $h^1$. Then the glass-holder can either uncover completely the aperture in the frame, or by pivoting in the ring $h$, it can be engaged partially in said aperture.

The handles for operating the glass-holder $b$ may be arranged as in the preceding constructional forms, or they may be constituted by the actual trunnions $b^3$ extended for that purpose. The nut $h^3$ allows of fixing the glass-holder in any position relatively to its ring $h$, that is compatible with the position of the trunnions $b^3$ in the grooves $h^2$ of the said ring.

It is to be understood that the constructional forms of this invention, as hereinbefore described and as illustrated, are given solely by way of examples, and that they may be considerably modified in their details as regards construction without departing from the nature of the invention.

Having now particularly described and ascertained the nature of my said invention and in what manner the same is to be performed, I declare that what I claim is:—

1. A port light comprising a fixed frame member provided with internal threaded sectors, a glass-holder having external threaded sectors adapted to interfit with those of the frame member and to engage therewith by a partial rotation of the glass-holder and, when out of engagement therewith, adapted to permit the free displacement of the glass-holder at right angles to the plane of the frame member, and coöperating sealing means on the glass-holder and on the porthole frame, rendered effective by the partial rotation of the glass-holder when in interfitted position with relation to the frame member.

2. A port light comprising a fixed frame member provided with internal threaded quadrants, a glass-holder having external threaded quadrants adapted to interfit with those of the frame member and to engage therewith by a partial rotation of the glass-holder and, when out of engagement therewith, adapted to permit the free displacement of the glass-holder at right angles to the plane of the frame member, and coöperating sealing means on the glass-holder and on the porthole frame, rendered effective by the partial rotation of the glass-holder when in interfitted position with relation to the frame member.

3. A port light comprising a fixed frame member provided with internal threaded sectors, a glass-holder having external threaded sectors adapted to interfit with those of the frame member and to engage therewith by a partial rotation of the glass-holder and, when out of engagement therewith, adapted to permit the free displacement of the glass-holder at right angles to the plane of the frame member, and coöperating sealing means on the glass-holder and on the porthole frame, rendered effective by the partial rotation of the glass-holder when in interfitted position with relation to the frame member, in combination with diametrically opposite peripheral trunnions on the glass-holder, and with trunnion supports on the frame member, adapted to support the glass-holder and to permit its angular displacement with respect to said frame member when the interfitting sectors of the latter and of the glass-holder are out of engagement.

4. A port light comprising a fixed frame member provided with internal threaded sectors, a glass-holder having external threaded sectors adapted to interfit with those of the frame member and to engage therewith by a partial rotation of the glass-holder and, when out of engagement therewith, adapted to permit the free displacement of the glass-holder at right angles to the plane of the frame member, and coöperating sealing means on the glass-holder and on the porthole frame, rendered effective by the partial rotation of the glass-holder when in interfitted position with relation to the frame member, in combination with a porthole cover having external threaded sectors, the glass-holder having internal threaded sectors adapted to interfit with those of the cover and to engage therewith by a partial rotation of the cover when in interfitted position with relation to the glass-holder.

5. A porthole comprising a fixed frame member, a ring hinged on said frame, a glass-holder carried inside said ring, internal threaded sectors, on the fixed frame, corresponding external threaded sectors on the glass-holder, the threaded sectors of the glass-holder being adapted to interfit with those of the frame, when the glass-holder carrying ring is pivoted and forced against the fixed frame, and to engage with the threaded frame sectors by a partial rotation of the glass-holder in its carrying ring, together with coöperating sealing means on the glass-holder and on the porthole frame, said sealing means being rendered effective by the partial rotation of the glass-holder in its carrier ring when in interfitted position in relation to the frame member.

6. A porthole comprising a fixed frame member, a ring hinged on said frame, a glass-holder carried inside said ring, internal threaded quadrants on the fixed frame, corresponding external threaded quadrants on the glass-holder, the threaded quadrants of the glass-holder being adapted to interfit with those of the frame, when the glass-holder carrying ring is pivoted and forced against the fixed frame, and to engage with the threaded frame quadrants by a partial rotation of the glass-holder in its carrying ring, together with coöperating sealing means on the glass-holder and on the porthole frame, said sealing means being rendered effective by the partial rotation of the glass-holder in its carrier ring when in interfitted position with relation to the frame member.

7. A porthole comprising a fixed frame member, a ring hinged on said frame, a glass-holder carried inside said ring, internal threaded sectors on the fixed frame, corresponding external threaded sectors on the glass-holder, the threaded sectors of the glass-holder being adapted to interfit with those of the frame, when the glass-holder carrrying ring is pivoted and forced against the fixed frame, and to engage with the threaded frame sectors by a partial rotation of the glass-holder in its carrying ring, diametrically opposite peripheral trunnions on the glass-holder, engaged and guided in slots provided in the carrier ring and adapted to turn in said slots, together with sealing means on the glass-holder and on the porthole frame, said sealing means being rendered effective by the partial rotation of the glass-holder in its carrier ring when in interfitted position in relation to the frame member.

8. A porthole comprising a fixed frame member, a ring hinged on said frame, a glass-holder carried inside said ring, internal threaded sectors on the fixed frame, corresponding external threaded sectors on the glass-holder, the threaded sectors of the glass-holder being adapted to interfit with those of the frame, when the glass-holder carrying ring is pivoted and forced against the fixed frame, and to engage with the threaded frame sectors by a partial rotation of the glass-holder in its carrying ring, together with coöperating sealing means on the glass-holder and on the porthole frame, said sealing means being rendered effective by the partial rotation of the glass-holder in its carrier ring when in interfitted position in relation to the frame member, in combination with a porthole cover having external threaded sectors, the glass-holder having internal threaded sectors adapted to interfit and coöperate with those on the cover, for the purpose described.

In testimony whereof I have signed my name to this specification.

CLAUDE LAUPRÈTRE.

Witnesses:
R. A. DUPONT.
ED. COAREY.